(12) United States Patent
Green

(10) Patent No.: US 10,803,577 B2
(45) Date of Patent: Oct. 13, 2020

(54) REVERSE ENGINEERING DATA ANALYSIS SYSTEM, AND INTEGRATED CIRCUIT COMPONENT DATA PROCESSING TOOL AND METHOD THEREOF

(71) Applicant: TechInsights Inc., Ottawa, Ontario (CA)

(72) Inventor: Michael Green, Nepean (CA)

(73) Assignee: TechInsights Inc., Ottawa (CA)

( * ) Notice: Subject to any disclaimer, the term of this patent is extended or adjusted under 35 U.S.C. 154(b) by 30 days.

(21) Appl. No.: 16/200,377

(22) Filed: Nov. 26, 2018

(65) Prior Publication Data

US 2019/0206040 A1    Jul. 4, 2019

(30) Foreign Application Priority Data

Dec. 28, 2017   (CA) ..................................... 2990205

(51) Int. Cl.
| | |
|---|---|
| G06F 30/327 | (2020.01) |
| G06F 30/398 | (2020.01) |
| G06F 21/14 | (2013.01) |
| G06T 7/00 | (2017.01) |

(52) U.S. Cl.
CPC .............. *G06T 7/001* (2013.01); *G06F 21/14* (2013.01); *G06F 30/327* (2020.01); *G06F 30/398* (2020.01); *G06T 2207/30148* (2013.01)

(58) Field of Classification Search
USPC ........................................................ 716/106
See application file for complete search history.

(56) References Cited

U.S. PATENT DOCUMENTS

| | | | |
|---|---|---|---|
| 5,737,233 | A | 4/1998 | Rao |
| 5,796,625 | A | 8/1998 | Scepanovic et al. |
| 5,995,114 | A | 11/1999 | Wegman et al. |
| 6,499,133 | B1 | 12/2002 | Kurokawa et al. |
| 6,550,046 | B1 | 4/2003 | Balasa et al. |

(Continued)

OTHER PUBLICATIONS

Abboud et al., "Mathematical Methods for Physical Layout of Printed Circuit Boards: An Overview", ZIB (Zuse Institute Berlin) report Jun. 29, 2006, Germany, pp. 1-16.

(Continued)

*Primary Examiner* — Bryce M Aisaka
(74) *Attorney, Agent, or Firm* — Knobbe, Martens, Olson & Bear, LLP

(57) ABSTRACT

Described are reverse engineering data analysis systems, and integrated circuit component data processing tools and methods thereof. A system can comprise: a data storage device operable to store a data structure comprising extracted IC component data nodes representative of corresponding IC components of target IC and a connectivity therebetween; a graphical user interface (GUI); and a digital data processor operable on said data structure to: render, via said GUI, a dynamic graph of said data nodes; graphically migrate at least some of said data nodes on said dynamic graph as a function of a connectivity thereof with other nodes, wherein connected nodes are attractively displaced relative to one another such that said migrating nodes progressively cluster with related nodes to define distinct IC component clusters representative of distinct groups of related IC components of the target IC, whereas unconnected notes are repulsively displaced so to progressively distance said unconnected nodes.

22 Claims, 11 Drawing Sheets

(56) References Cited

U.S. PATENT DOCUMENTS

| | | | |
|---|---|---|---|
| 6,725,437 | B1 | 4/2004 | Rao et al. |
| 7,296,252 | B2 | 11/2007 | Alpert et al. |
| 7,984,410 | B2 | 7/2011 | Chen et al. |
| 8,269,790 | B2 * | 9/2012 | Wong .................. G06T 11/60 345/619 |
| 8,762,121 | B2 | 6/2014 | Xu |
| 2004/0040007 | A1 | 2/2004 | Harn |
| 2005/0180330 | A1 | 8/2005 | Shapiro |
| 2010/0162151 | A1 * | 6/2010 | Class .................. G06F 3/0483 715/765 |
| 2017/0084064 | A1 | 3/2017 | Glover |

OTHER PUBLICATIONS

Chan et al., "Multilevel Generalized Force-directed Method for Circuit Placement", Proceedings of the 2005 international symposium on Physical design, 2005, pp. 185-192.

Frishmann R., "Interactive & Dynamic Force-Directed Graphs with D3", https://medium.com/ninjaconcept/interactive-dynamic-force-directed-graphs-with-d3-da720c6d7811, accessed on Nov. 8, 2018.

Fruchterman T. M. & Reingold E.., "Graph Drawing by Force-directed Placement", Software-Practice and Experience, 1991, vol. 21, No. 11, pp. 1129-1164.

Kobourov, S., "Spring Embedders and Force Directed Graph Drawing Algorithms", arXiv:1201.3011v1 , 2012, pp. 1-23.

Noack A., "Energy Models for Graph Clustering", Journal of Graph Algorithms and Applications, 2007, vol. 11, No. 2, pp. 453-480.

Schaeffer S. E., "Graph clustering", Computer Science Review, 2007, vol. 1, No. 1, pp. 27-64.

Schaik S. V., "Force-directed methods for clustered graph drawing: Lecture about chapter 10 of [GD] and several papers", Utrecht University, Course: Information and Computing Science.

Tunkelang, D.. "A Numerical Optimization Approach to General Graph Drawing", Doctoral Thesis submitted to the School of Computer Science, Carnegie Mellon University, Pittsburgh, PA, 1999, 90 page.

* cited by examiner

REVERSE ENGINEERING DATA ANALYSIS SYSTEM, AND INTEGRATED CIRCUIT COMPONENT DATA PROCESSING TOOL AND METHOD THEREOF

CROSS REFERENCE TO RELATED APPLICATIONS

This application claims the benefit of Canadian Patent Application No. 2,990,205, filed Dec. 28, 2018, which is incorporated herein by reference in its entirety.

FIELD OF THE DISCLOSURE

The present disclosure relates to reverse engineering (RE) tools and systems and, in particular, to a reverse engineering data analysis system, and integrated circuit (IC) component data processing tool and method thereof.

BACKGROUND

Understanding the functionality of an integrated circuit (IC), for example, a digital IC, starting from the finished device can be challenging. For example, modern digital IC designs are often created using a highly automated process. For instance, they are typically designed by writing a high-level description of their function in a hardware description language which is then synthesized to the logic gate level. This approach, along with the increasing use of libraries of previously designed circuit sub-blocks (e.g. hard and/or soft "macros") can enable the routine creation of a wide variety of gate designs.

The highly automated process, also known as auto-routing, often includes software programs that automatically place electrical components in a space efficient manner, which may not necessarily result in logically ordered or visually intuitive circuit layouts. As a result, circuit elements representing the same functional block may have different layouts.

While IC reverse engineering technologies have been developed to recreate, with a reasonable degree of automation and accuracy, a low-level netlist (otherwise known as gate, primitive or cell level netlists) of an IC, organization and analysis of these netlists into functional, modular and/or hierarchical blocks currently still heavily relies on substantial expert level human effort, which is not only highly time consuming, but can also be highly cost ineffective.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a reverse engineering data analysis system, and integrated circuit component data processing tool and method thereof, that overcome some of the drawbacks of known techniques, or at least, provides a useful alternative thereto. Some aspects of this disclosure provide examples of such systems and method. For example, in some embodiments, a system and method are provided to facilitate the computational organization, analysis and/or classification of IC components of an IC into functional, modular and/or hierarchical blocks.

In accordance with one aspect, there is provided an integrated circuit (IC) reverse engineering data management system for processing IC component data extracted from a target IC, the system comprising: a data storage device operable to store a data structure comprising a plurality of extracted IC component data nodes representative of a corresponding plurality of IC components of the target IC and a connectivity therebetween; a graphical user interface (GUI); and a digital data processor operable on said data structure to: render, via said GUI, a dynamic graph of said data nodes; graphically migrate at least some of said data nodes on said dynamic graph as a function of a connectivity thereof with other nodes, wherein connected nodes are attractively displaced relative to one another such that said migrating nodes progressively cluster with related nodes to define distinct IC component clusters representative of distinct groups of related IC components of the target IC, whereas unconnected nodes are repulsively displaced so to progressively distance said unconnected nodes.

In one embodiment, the data structure further associates an initial physical location for each of said extracted IC component data nodes in accordance with an extracted physical IC layout of the target IC; wherein said dynamic graph is initially rendered based on each said initial physical location in accordance with said extracted physical IC layout; and wherein said at least some data nodes are initially graphically migrated from their respective initial physical location.

In one embodiment, the digital data processor is further operable to graphically migrate said at least some data nodes as a function of a distance therebetween.

In one embodiment, the distance function comprises a linear attractive force function for connected nodes.

In one embodiment, the distance function comprises a logarithmic attractive force function for connected nodes.

In one embodiment, the attractive force function is reversed within a halo distance from any of said connected nodes to reduce node overlap.

In one embodiment, the distance function further comprises a repulsive force component applied between each said at least some data nodes that are located within a threshold repulsion distance so to progressively distance any of said unconnected nodes that are within said threshold repulsion distance.

In one embodiment, the digital processor is operable to graphically migrate said at least some data notes based on a damped force-directed process.

In one embodiment, the data structure comprises a netlist.

In one embodiment, the digital processor is further operable to graphically render said connectivity for a selection of said nodes by visually rendering cluster connections for selected IC component clusters.

In one embodiment, the distinct IC component clusters are representative of distinct IC functional groups.

In one embodiment, the system further comprises an IC component extraction tool automatically extracting said extracted IC component data nodes from one or more digital images of the target IC.

In one embodiment, the system further comprises an IC imaging device for imaging the target IC and generate said one or more digital images.

In one embodiment, the digital data processor is further operable to render said dynamic graph as an interactive mapping of said nodes and enable digital input characterization of selected nodes via said mapping based on said clusters to update said data structure accordingly.

In accordance with another aspect, there is provided a non-transitory computer-readable medium for managing extracted integrated circuit (IC) reverse engineering (RE) data and having computer-executable instructions stored thereon to: access a stored data structure comprising a plurality of extracted IC component data nodes representative of a corresponding plurality of IC components of a target IC and a connectivity therebetween; render, via a graphical user interface (GUI), a dynamic graph of said data nodes; and iteratively calculate a displacement of at least some of said data nodes as a function of a connectivity thereof with other nodes, wherein connected nodes are attractively displaced relative to one another and whereas unconnected nodes are repulsively displaced relative to one another; graphically migrate said at least some data nodes on said dynamic graph based on said iterative calculation such that said migrating nodes progressively cluster with related nodes to define distinct IC component clusters representative of distinct groups of related IC components of the target IC.

In one embodiment, the stored data structure further associates an initial physical location for each of said extracted IC component data nodes in accordance with an extracted physical IC layout of the target IC; wherein said dynamic graph is initially rendered based on each said initial physical location in accordance with said extracted physical IC layout; and wherein said at least some data nodes are initially graphically migrated from their respective initial physical location.

In one embodiment, the computer-readable medium further comprises instructions to calculate said attractive displacement of said at least some data nodes as a function of a distance therebetween.

In one embodiment, the distance function comprises a linear attractive force function for connected nodes.

In one embodiment, the distance function comprises a logarithmic attractive force function for connected nodes.

In one embodiment, the attractive force function is reversed within a halo distance from any of said connected nodes to reduce node overlap.

In one embodiment, the distance function further comprises a repulsive force component applied between each said at least some data nodes that are located within a threshold repulsion distance so to progressively distance any of said unconnected nodes that are within said threshold repulsion distance.

In one embodiment, the computer-readable medium further comprises instructions to iteratively calculate said displacement are based on an iterative damped force-directed process applied between said at least some nodes.

In one embodiment, the data structure comprises a netlist.

In one embodiment, the computer-readable medium further comprises instructions to graphically render said connectivity for a selection of said nodes by visually rendering cluster connections for selected IC component clusters.

In one embodiment, the distinct IC component clusters are representative of distinct IC functional groups.

In one embodiment, the computer-readable medium further comprises instructions for extracting said extracted IC component data nodes from one or more digital images of the target IC.

In one embodiment, the computer-readable medium further comprises instructions to render said dynamic graph as an interactive mapping of said nodes and enable digital input characterization of selected nodes via said mapping based on said clusters to update said data structure accordingly.

In accordance with another aspect, there is provided a computer-implemented process for managing integrated circuit (IC) reverse engineering (RE) data comprising: accessing a stored data structure comprising a plurality of extracted IC component data nodes representative of a corresponding plurality of IC components of a target IC and a connectivity therebetween; rendering, via a graphical user interface (GUI), an interactive graph of said data nodes, wherein data stored against each of said data nodes is graphically accessible from and editable via said interactive graph; iteratively calculating a displacement of at least some of said data nodes as a function of a connectivity thereof with other nodes, wherein connected nodes are attractively displaced relative to one another and whereas unconnected nodes are repulsively displaced relative to one another; graphically migrating said at least some data nodes on said interactive graph based on said iterative calculation such that said migrating nodes progressively cluster with related nodes to define distinct IC component data node clusters representative of distinct groups of related IC components of the target IC; and receiving selective data node edits for a given group of related IC components via digital selection of a given data node cluster on said interactive graph.

In one embodiment, the stored data structure further associates an initial physical location for each of said extracted IC component data nodes in accordance with an extracted physical IC layout of the target IC; wherein said dynamic graph is initially rendered based on each said initial physical location in accordance with said extracted physical IC layout; and wherein said at least some data nodes are initially graphically migrated from their respective initial physical location.

In one embodiment, the iteratively calculating comprises calculating said displacement of said at least some data nodes as a function of a distance therebetween.

In one embodiment, the distance function comprises at least one of a linear attractive force function or a logarithmic attractive force function for connected nodes.

In one embodiment, the data structure comprises a netlist.

In one embodiment, the distinct IC component clusters are representative of distinct IC functional groups.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

Figure 1:
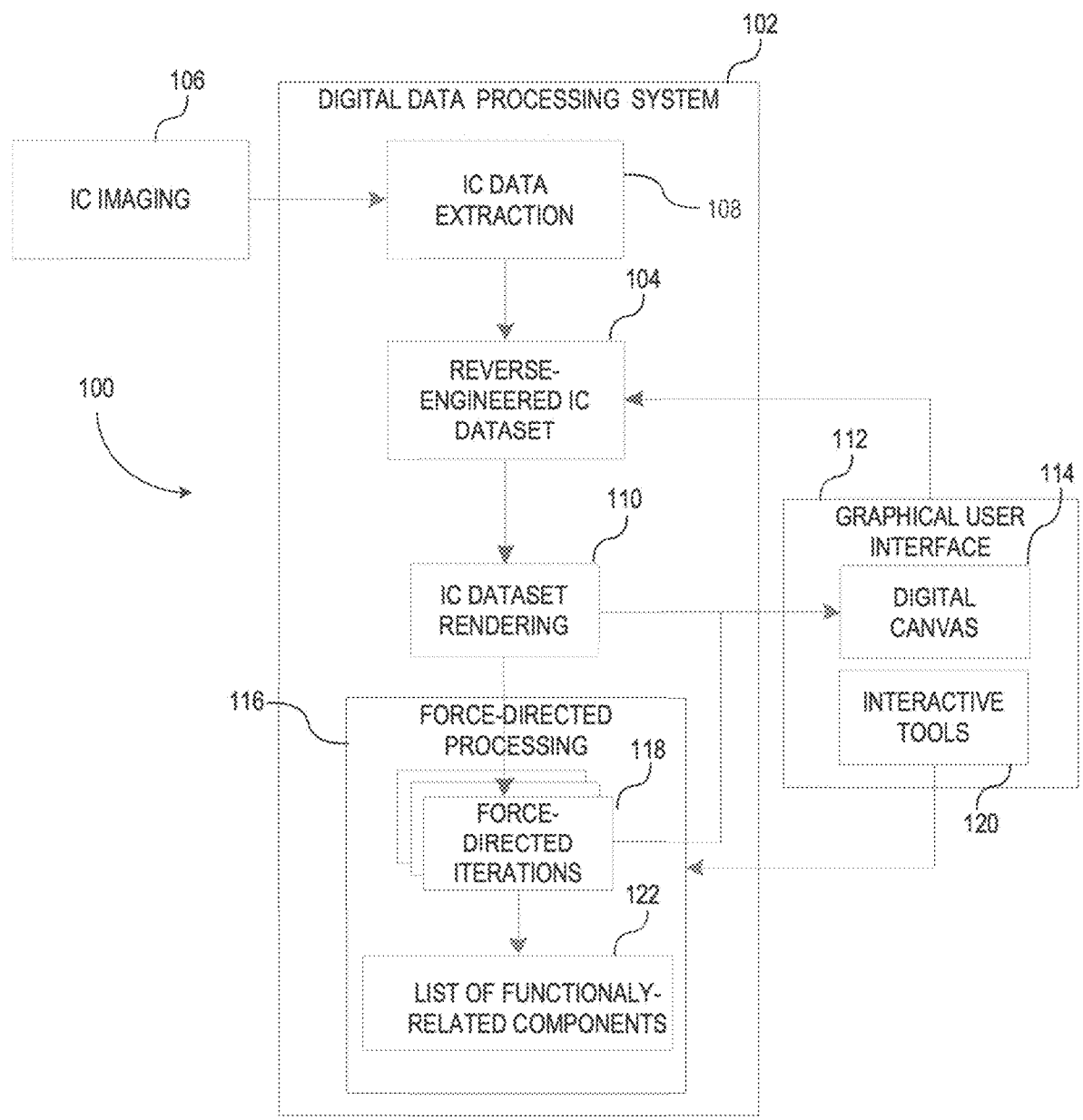
FIG. 1 is a diagram of a reverse engineering data analysis system, and integrated circuit (IC) component data rendering and organization tool thereof, in accordance with one embodiment.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

The systems and methods described herein provide, in accordance with different embodiments, different examples of a reverse engineering data analysis system, and integrated circuit (IC) component data processing tool and method thereof. For instance, the systems and methods as described herein comprise various computational tools and functions that, when used alone or in combination, can facilitate, accelerate and/or improve the generally laborious and time-intensive task of analysing, characterising, classifying and/or interpreting reverse engineering images of target integrated circuits, or portions thereof, for the purposes of reconstructing a functional, hierarchical, structural, and/or like layout or design of this target for further analysis, reporting and/or duplication, for example. As will be detailed further below, the embodiments considered herein invoke certain computational tools and processes that, when operating on extracted IC component data, such as a low-level net list or like data structure, can be used to effectively visually cluster various inter-related data nodes on an IC component graph in facilitating identification of functional IC component groups and/or subgroups, related or similarly operable or interconnected IC component types and/or features, or like graph node aggregations. Upon visually clustering such data nodes via an automated IC component data node clustering or grouping process, data node annotations, analysis and/or classifications can be more expediently and/or accurately achieved, as can, in some embodiments, the interconnections thereof be more readily observed, analysed and/or characterised, for example. These and other uses, functions and/or advantages of the herein described systems and methods will be further detailed below, as will be readily appreciated by the skilled artisan.

With reference to FIG. 1 and in accordance with some embodiments, an exemplary reverse engineering data analysis system, generally referred to herein using the numeral 100, will now be described. In this embodiment, the system generally comprises a digital data processing system 102 having one or more digital data processors (not shown) for processing RE IC component data, such as RE IC dataset 104. For example, the system 100 may be configured to access, interface with, or directly acquire RE data via an IC imaging device or system 106. IC imaging devices are readily known in the art to include, but are not limited to, scanning electron microscopes (SEM), transmission electron microscopes (TEM), focused and/or broad ion beam (FIB) imaging devices, atomic force microscopes (ATM), optical microscopes, or like devices. Image date acquired with and/or accessed from such imaging devices 106 may then be processed by automated IC data extraction tools 108, for example resulting in the automated extraction of low-level IC component data representative of the imaged IC components and identifying such components by type, structure, connections and interconnections, or like qualifiers. In one such embodiment, the IC data extraction tools 108 may result in the compilation of the RE IC dataset 104 in the form of a low-level netlist for example, or other like data structures representing each extracted IC component as a series of interconnected IC component data nodes each having associated therewith an initial IC layout location and layout connection information consistent with the imaged IC layout, for example. Other related, extracted and/or progressively acquired or derived layout and IC component information may be stored within or in association with such data structure, for example, to identify distinct IC component functions, interactions, functional groups, features or the like. Such data structures will be readily known to the skilled artisan and thus need not be further described herein.

In one embodiment, the system 100 is then configured to read and process the input dataset 104, which will generally contain low-level information representative of a target reversed-engineered IC, for example, a netlist. Again, this dataset may have been generated from an integrated circuit extraction verification system or like extraction tools 108. For example, this dataset may contain, at least in part, an extracted component layout (placement/location of each component), their type and the presence of interconnections between the pins of each component, for example. Different RE IC dataset types, formats and/or structures may also be considered, as will be appreciated by the skilled artisan, as can different information be included for each or some of the dataset nodes either from direct extraction and/or via manual input during the extraction and preliminary analysis/characterization process. As will be detailed below, using the techniques described herein, further RE IC component characterizations may be efficiently and accurately produced through automated component data clustering techniques, and dynamic and/or interactive data rendering and editing tools related thereto, for example.

In that respect, and in accordance with one embodiment, an initial input graph can be constructed via an IC dataset rendering engine 110 from the information contained within the input dataset 104. This initial input graph can then be rendered on an integrated or interfacing graphical user interface 112, wherein each vertex or node in the graph is generally representative of a component in the source IC and the initial layout of the nodes within the graph, in some implementations, is taken from the components' layout in the source IC. It will be noted that while an initial graph rendering corresponding with known physical IC layout positions may be preferable in some implementations, other implementations may rather initiate from a randomized graph, or again, from some other preset or designated initial rendering configuration which may be expected to provide greater component visibility, clustering efficiency and/or information during visualization of subsequent graph iterations/component migrations. In other examples, actual component locations on the target IC may not be known or stored in the accessed data structure, such that an accurate physical depiction of the extracted IC layout is not readily accessible.

Information about the presence of interconnections between the pins of each component can also be used, in some examples, to extract the connectivity of each node (e.g. stored in a connection table). In some embodiments, global nets are automatically excluded when building the connection table because the act of being connected to the same power supply does not usually indicate any sort of functional relationship between two components. Moreover, some chips feature many distinct power domains. In this case it is conceivable that the power supply connection could predict a functional relationship between two components. To speed computations of the connections between nodes, some embodiments store the nodes connections in an "adjacency matrix" implemented as a sparse table.

Figure 2:
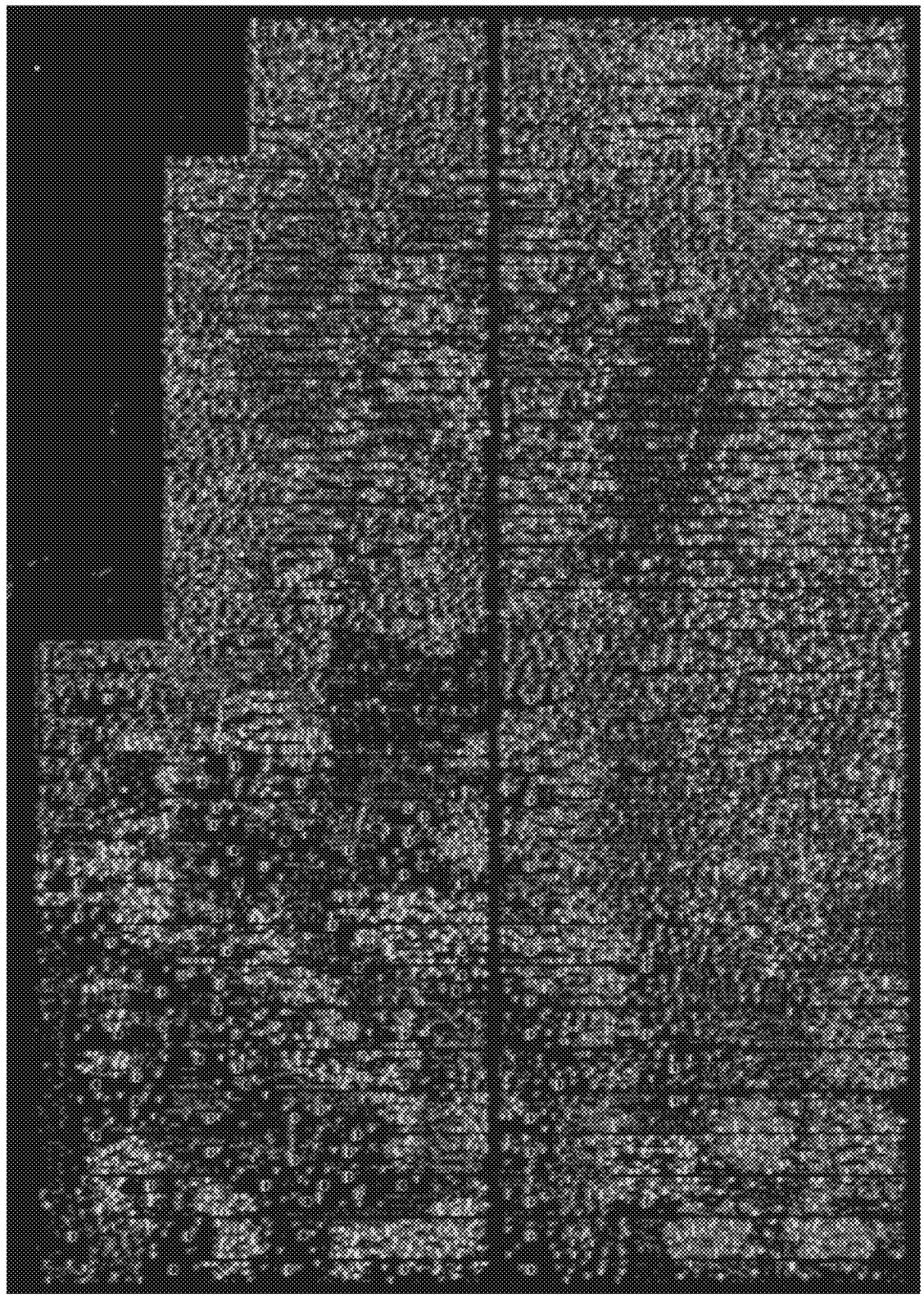
FIG. 2 is an exemplary screenshot of an initial extracted IC circuit layout image representative of a physical IC layout of reverse engineered IC components, to be processed via the system of FIG. 1.

In the illustrated embodiment of FIG. 1, the input graph is visualized in a window (or digital canvas) 114 located within the interactive user interface 112. Each node may be graphically represented on the canvas 114 by an icon indicative of the component type, for example, or other visual identifier including, but not limited to, an alphanumeric code, indicia, icon, graphic or like digital graphical identifier. FIG. 2 provides an exemplary screenshot of an initial extracted IC circuit layout image representative of a physical IC layout of reverse engineered IC components, to be processed via the system 100.

Figure 3A:
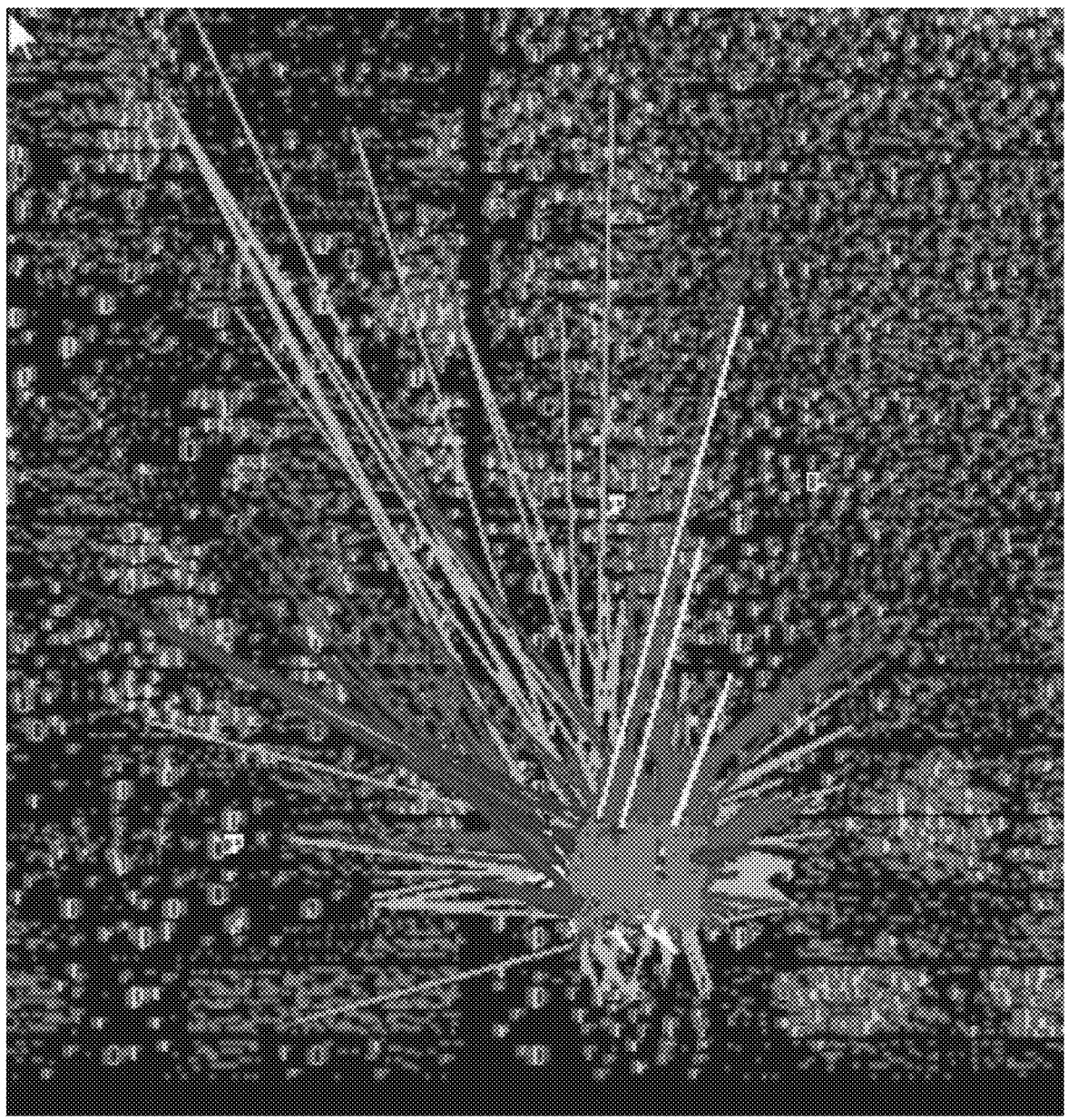
FIGS. 3A and 3B are exemplary screenshots of respective portions of the extracted IC circuit layout image of FIG. 2, in which are respectively shown inter-component connections (e.g. flight-lines) between a relatively small and large number of manually selected components.
Figure 3B:
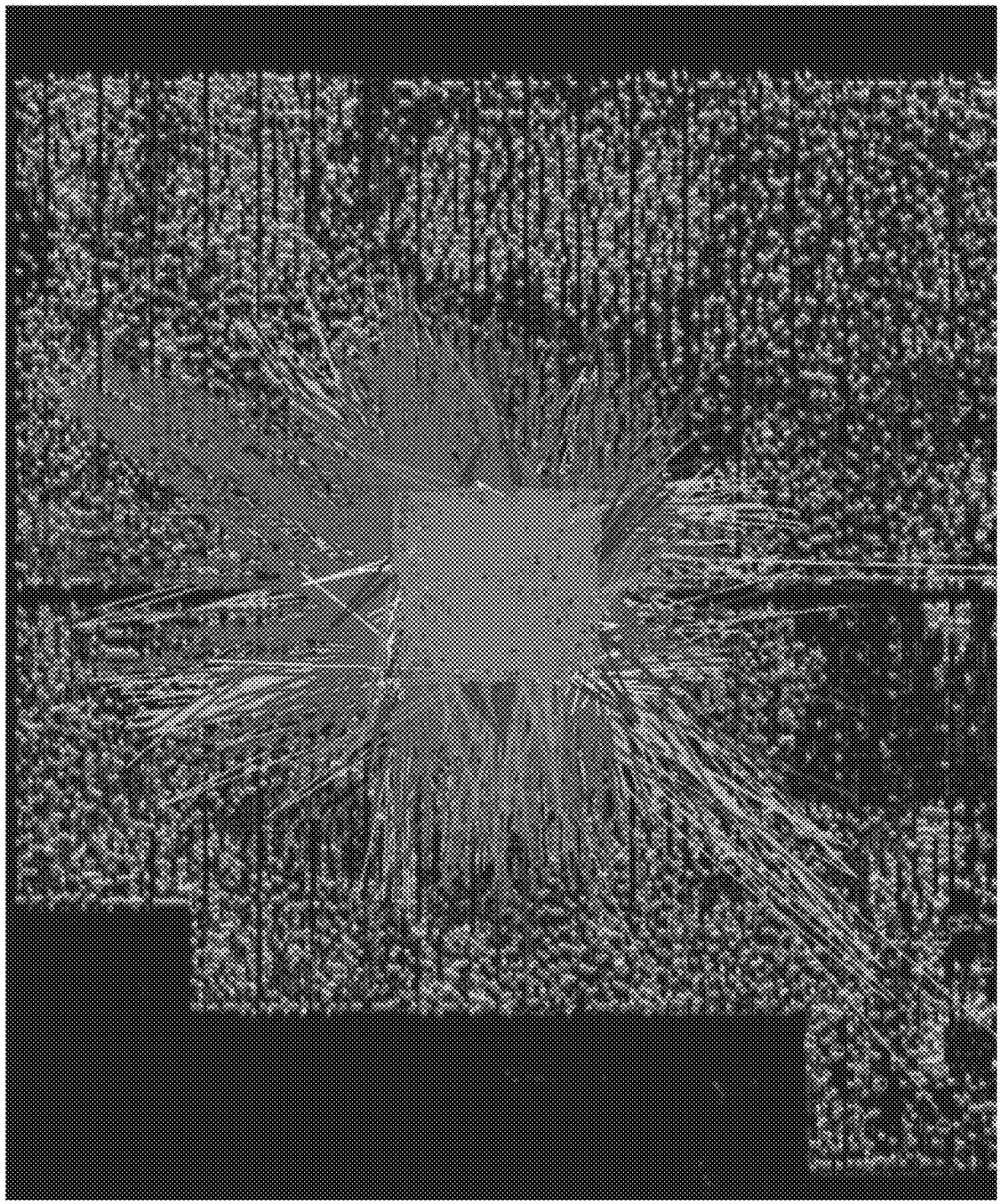

As noted above, the connections between nodes may also be graphically represented by straight (coloured) lines (also called "flightlines"). For example, coloured flightlines may be coloured according to the type of connection between the components (i.e. input or output, power connection, etc.). FIGS. 3A and 3B provide exemplary screenshots of respective portions of the extracted IC circuit layout image of FIG. 2, in which are respectively shown inter-component connections (e.g. flight-lines) between a relatively small and large number of manually selected components, for example.

As shown by the examples of FIGS. 2, 3A and 3B, the graphical user interface 112 of the system 100 may provide not only for graphical visualization of the extracted input graph, but also dynamically and/or selectively provide access to extracted or derived IC layout data (e.g. via interactive tools 120), such as flight-line data as noted above, but also interactive access to stored IC component node data via a complementary dataset visualization window or portal providing access to various stored node information such as node type, location, identification number, name, function, relationship to other nodes and/or identified functional groups, power connections, etc. Other data types may also or alternatively be considered, as will be readily appreciated by the skilled artisan, without departing from the general scope and nature of the present disclosure.

With continued reference to FIG. 1, the rendered IC data set is then selectively processed via a IC data node clustering process, generally referred to herein as a force-directed or like process 116, so to progressively migrate all or selected IC data nodes from their respective initial physical location on the graph as a function of a connectivity thereof with other nodes. For example, in one embodiment, connected nodes are attractively displaced relative to one another whereas unconnected nodes are repulsively displaced relative to one another such that migrating nodes progressively cluster with related nodes to define distinct IC component clusters representative of distinct groups of related IC components of the target IC. Accordingly, IC component connection data allows extracted IC data nodes to migrate from their initial location, as generally defined by their initial location on the target IC, to congregate in accordance with their actual physical IC component connections and, thus in most cases, consistent with inter-component functional or relational attributes.

Figure 4A:
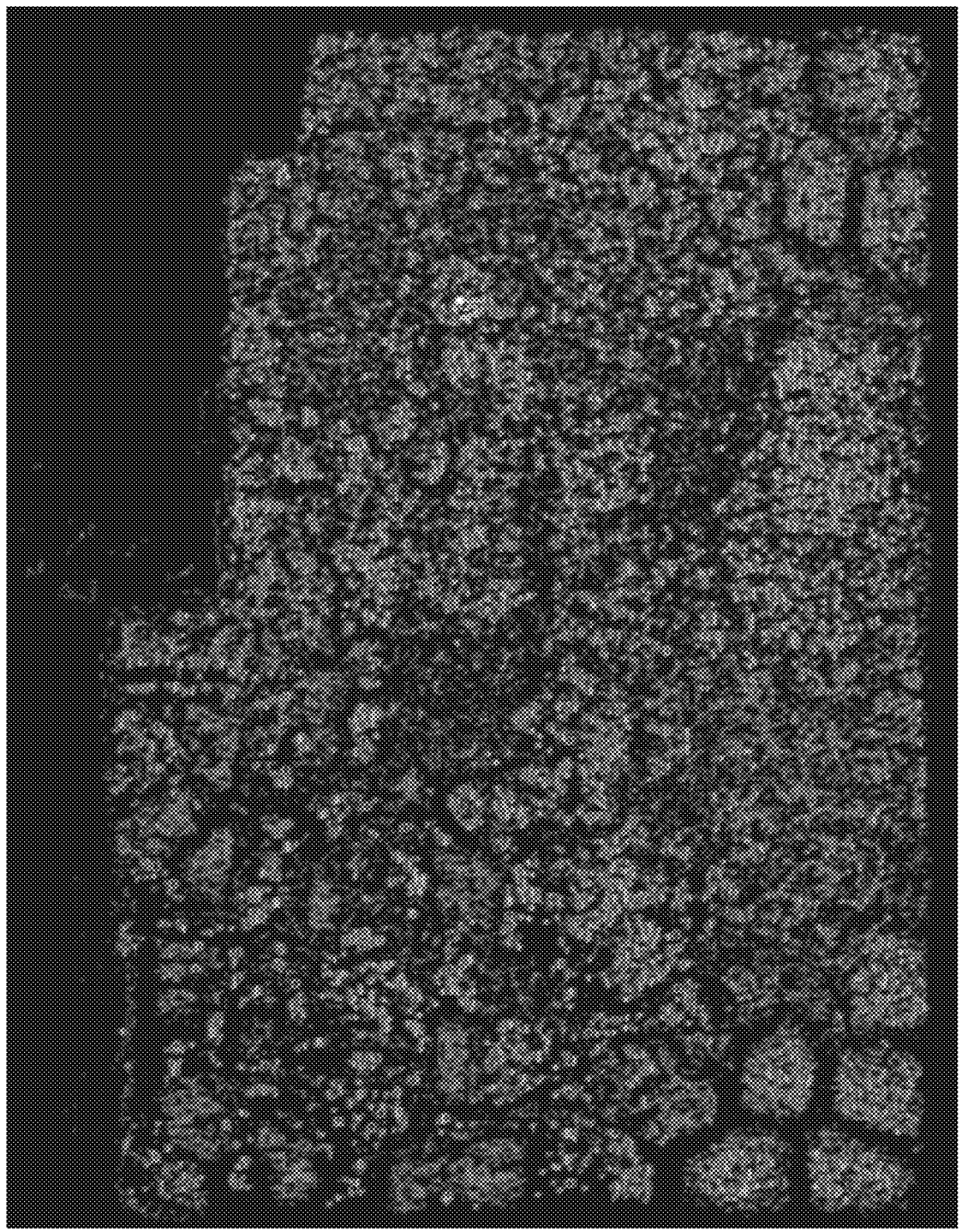
FIGS. 4A, 4B and 4C are exemplary screenshots showing a sequential evolution of the extracted IC component image of FIG. 2 upon executing 10, 50 and 150 iterations, respectively, of an automated visual IC component clustering tool of the system of FIG. 1.
Figure 4B:
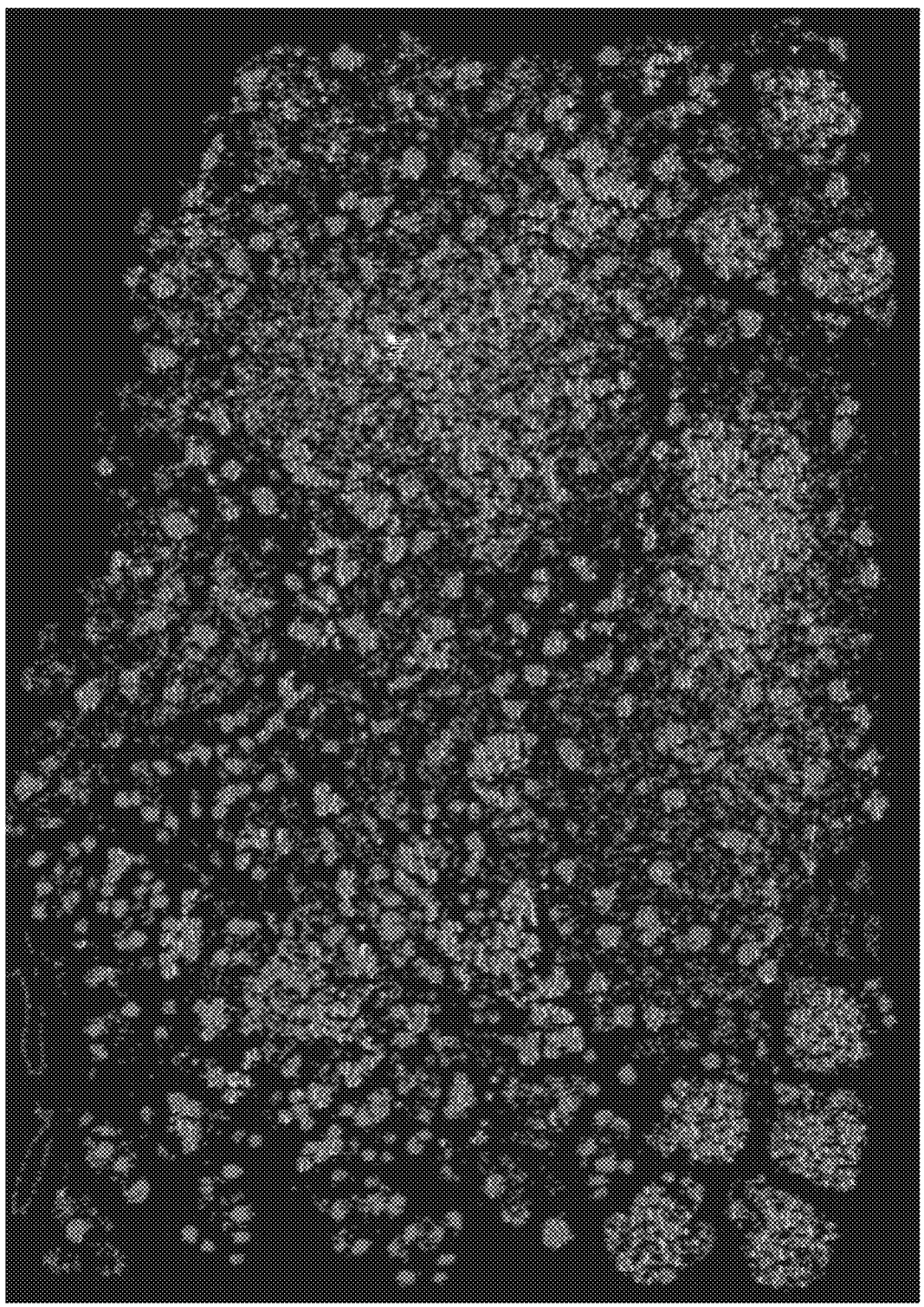
Figure 4C:
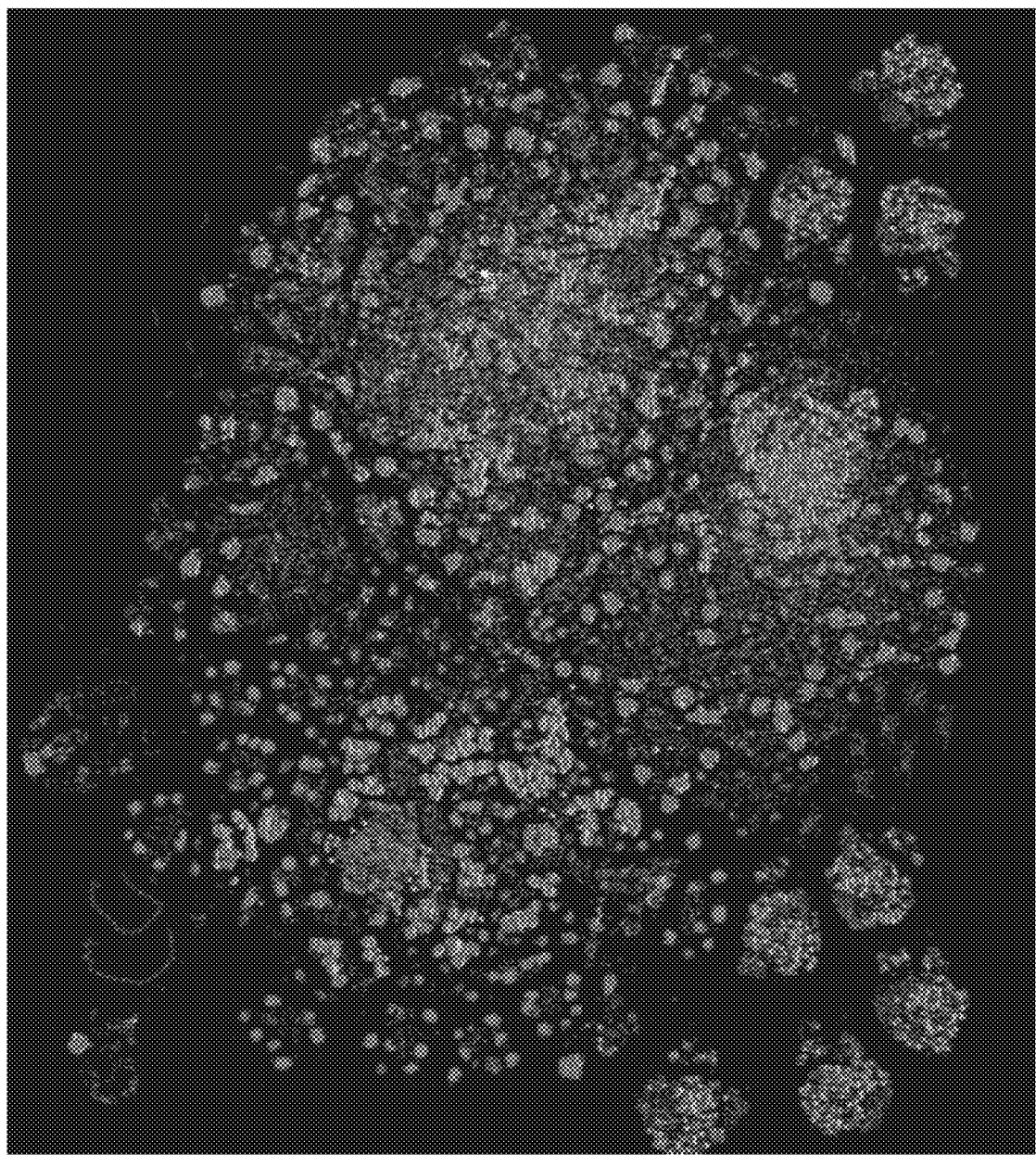

In one example, as illustrated in FIG. 1, the layout of the nodes within the graph is iteratively modified at 118 using a force-directed process 116 operating on the processing system 102. For example, the iterative process 118 can recalculate the layout of the initial graph using only information contained within the structure of the graph itself, rather than relying on domain-specific knowledge, so to facilitate the visualization, and ultimately analysis and/or classification of extracted IC component data, without or with minimal user intervention. FIGS. 4A, 4B and 4C provide exemplary screenshots of the sequential evolution of the extracted IC component image of FIG. 2 upon executing 10, 50 and 150 iterations, respectively, of a force-directed IC component data node clustering process, for example.

The force-directed process as described herein can be used to effectively cluster related IC component data nodes for the purpose of graph clustering. Accordingly, the force-directed process as descried herein can be used to extract a list of functionally related IC components 122, or otherwise at least graphically render such functionally related IC components on the digital canvas 114 for interactive processing via GUI tools 120, for example. Namely, bulk IC component data node characterization and/or classification may be interactively processed using these interactive tools 120, for instance, by dynamically selecting aggregating or otherwise clustering IC component nodes on the iterative graph rendered on the canvas 114 and operating a bulk character assignment or like function of the GUI. Other bulk or cluster-specific processing, classification and/or characterization tools may also or alternatively be considered, as will be readily appreciated by the skilled artisan. In doing so, the RE IC dataset 104 may be progressively updated and/or refined through iterative clustering and/or operator analysis and/or interaction via GUI 112, ultimately leading to a more complete and informative data set for further processing, analysis and/or distribution, for example.

Known design layout optimization techniques common to IC design solutions generally seek to maximize circuit performance by minimizing path lengths interconnecting the various circuit elements, while ensuring routing of all nets and while respecting imposed dimensional and performance constraints. End results can then be viewed and tested for compliance and otherwise reset by adjusting certain layout parameters. In stark contrast, the proposed embodiments are concerned with the opposite problem, wherein, in a reverse engineering context, the initial placement of the set of components of a target IC (low-level netlist or like IC data component data structure) is known from data extractions using different imaging techniques, but whereas the general, group and itemized function of each component is not previously known. The force-directed graphing process, as described herein, is thus executed to at least partially automate and facilitate the analysis of these netlists into functional, modular and/or hierarchical blocks so to provide greater visibility and access to the various IC layout operations, functions and features of the target IC. In doing so, not only is the downstream clustering of migrating IC component data nodes often quite informative as to the functional aspects of the extracted layout and its components, but also how such data nodes iteratively migrate on the dynamic and/or interactive graph in relation to other nodes and/or clusters. To that end, the evolution of the force-directed process may provide valuable information beyond what may otherwise be available from a static end point graph. Further optional interactive tools such as single or bulk IC data component node pinning, displacement and/or redistribution can dynamically impact the evolution of the migrating graph and provide valuable insight into the functional attributes of the various IC component represented by the migrating IC component data nodes.

In some embodiments, and as introduced above, the space encompassing the graph (e.g. digital canvas 114) may be a 2-D Cartesian space wherein each position is expressed using a pair of numbers. For example, the positions in the graph may be represented using 32-bit integers to increase the speed of the clustering process described below, although more precise data types may also be used. In some embodiments, the space may be infinite and continuous; in other embodiments, the space may otherwise be a finite space wherein periodic boundary conditions are used. In some other embodiments, a higher dimensional space than a 2-D space may rather be used. For instance, in a 2-D space, strong repulsion forces associated with a defined halo region, as discussed further below within the context of an exemplary embodiment, a node on one side of a large, tightly converged group of nodes may have a difficult time pushing and shoving its way through if it needs to get to the other side of the group. Extending the dimensionality of the space to 3-D or more would allow such nodes to more easily slip past (behind or in front of) a tight cluster, for example. These and other such considerations will be understood by the skilled artisan to fall within the general scope and nature of the present disclosure.

Within this Cartesian space, in some embodiments, each component may associated with a given dimension, for example, measuring between 30 and 50 units in width and height. Other relative size and/or dimensional considerations may be addressed depending on the particular implementation of the graph rendering and processing technique employed, as will be readily appreciated by the skilled artisan.

In general, as introduced above, each pair of nodes in the extracted IC data structure that are connected will experience an attractive force between them. The attractive force may be linear or logarithmic, for example, with respect to the (graph) distance between the two nodes, although other functional forms may also be used. For example, using a logarithmic function may have the advantage of limiting the high accelerations and oscillations experienced by the components at the very beginning of the iterations. This may be useful, for example, since the initial position of the nodes are typically spread out over large distances (relative to the average size of a representative component), for example. For example, initial node locations may be associated with an extracted node location on the target IC layout and initially rendered as such. In other embodiments and/or implementations of a same embodiment, the initial IC component data node may be associated and rendered in accordance with a different location set, for instance, intentionally and/or randomly associated therewith during or after the data extraction process, or again, applied to an otherwise structured but location-unspecific data structure or netlist, to name a few examples. Accordingly, while an initial dynamic graph may visually represent a physical layout of the target IC, other implementations may do away with such representations or again may not have ready access to such physical location information, and nonetheless carry out the data note migration and clustering techniques described herein.

In some embodiments, each node may also be repelled away from all of their local neighbors. This repulsion force may be a linear function of the distance between nodes, although other functional forms may also be used. In such embodiments, any node that is less than a certain threshold distance away from another node is considered to be a "local neighbor". In some embodiments, this threshold distance may be 2000 units (as defined by the Cartesian graph environment) and may be user adjustable, for example. Using a distance threshold may speed up the calculations since there is no need to compute the repulsion forces for nodes that are very far from one another (since the forces are a function of the distance between nodes and at large distances the magnitude of the forces experienced are negligible). It was observed that using such a threshold tends to reduce the amount of residual slow "drifting apart" that one may typically observe toward the end of a minimization procedure, for example. Other repulsive force option may be considered, for example, where non-connected node pairs are specifically identified and repulsed from one another. While this may efficiently separate non-connected pairs at the outset, a threshold repulsion distance, or again a rapidly decreasing distance-dependent repulsion force function may avoid non-connected components from rapidly drifting apart. Other features, such as graph pinning or anchoring, as described below, may address some of these concerns.

Further optimization or customizations may be included in the force-directed process, as detailed below. For example, in digital ICs, nets have typically one "driver" and many "driven" pins. The driver component outputs a signal onto the net, whereas the driven components receive it. Given this input/output asymmetry, in some embodiments, the force calculations may also be asymmetric by having the node representative of a driver component strongly attracted to the node representative of its driven component, but having the driven instances weakly attract other driven instances on the same net. This may help break up large homogenous clusters where the connections between nodes don't follow regular patterns, for example.

In some embodiments, a global scale parameter and an offset parameter can also be used to apply a linear transform to all attraction and repulsion forces. For example, if the attractive force is strengthened, the nodes will tend to pull in tight toward the barycenter of the system. On the other hand, if the repulsive force is strengthened, the system will tend to "explode" with nodes moving rapidly far away from each other.

Accordingly, user-adjusted force parameters and customizations such as the above and/or other like adjustments may be interactively applied or adjusted (e.g. via interactive tools 120) to increase a clustering efficiency and speed with which a particular extracted IC layout graph may be processed, for example.

As noted above, the force-directed process may treat each node as if it occupies only a single point of space, though each node will generally have a particular length and width when drawn on the screen canvas, which may result in node overlap. Naturally, it may then be difficult to identify individual nodes and select them with a mouse or other interactive tool when an operator interfaces with the interactive canvas. To mitigate this, in some embodiments, a circular "halo" region may be defined around each node. In the currently described example, this region may be a circle of 200 units of diameter by default, although the size may be user adjustable. Using this approach, when calculating the attraction force between connected nodes, if a remote connected node is within the defined halo distance, the sign of the calculated force will become negative (effectively causing repulsion instead of attraction), and, in one particular embodiment, can be effectively changed from a logarithmic attraction function to an inverse (repulsive) linear function. Accordingly, while the inverse force is still a function of distance, in this embodiment, it may become stronger (e.g. in an inverse linear manner instead of logarithmic, with a large multiplicative constant). Two nodes should therefore not get so close as to overlap. In fact, most connected nodes will come to equilibrium somewhere just inside the halo distance (depending on the number of connections) where the attraction and repulsion forces locally balance.

In one illustrative embodiment, the force-directed system is minimized using a damped dynamics method, which works by accelerating the system in the direction of the force. For instance, one may assign "virtual" masses to each particle (IC data node) and let the forces act of on these particles, in some embodiments according to Newton's second law of mechanics. In some embodiments, all components have a unit mass, but other mass values may be used for different components. For example, components with higher relative masses would experience less acceleration compared to components will smaller relative masses, which may be beneficial when seeking to customize a particular graphing objective. For example, certain target components could be attributed a heavier relative mass so to have connected nodes preferably migrate thereto with the heavier node experiencing reduced relative motion. At one extreme, certain nodes, groups or clusters may be effectively pinned down on the graph (more or less equivalent to an infinite mass) so to avoid further migration of such nodes. This may be particularly useful when certain nodes or clusters are accurately identified and annotated and need not further migrate, thus reducing the likelihood that their further migration will impact or adversely interfering with slower force-balancing cluster migrations. These and other such functions and attributes may be readily considered within the present context.

Using a damped dynamic approach, the applied forces drive the change in acceleration of these "particles" as a function of "time", which in turn changes their velocity and their positions. The "time" variable here has no physical meaning per se, it is just a quantity used to solve numerically the differential equations of motion and is instead representative of the number of iteration steps taken by the process. After a number of iterations, the position of these particles will tend to converge to equilibrium or near-equilibrium clustered configurations. For the purpose of simplifying the force calculations, the position of each node is a point located at its center of area of the icon, indicia or identifier used to represent it on screen. Effectively then, even though the nodes are shown having an area, they're treated by the computational process as if they are single point particles.

In this embodiment, each node is also subjected to a friction force (or damping or drag force), hence the name "damped dynamics", to limit the high speeds some nodes may acquire during the minimization procedure. The friction force may be modelled as a small force with a magnitude proportional to the node's speed but oriented in the inverse direction of its velocity, for example. Other damping functions may be considered, as will be readily appreciated by the skilled artisan.

The damped dynamics minimization process generally works by calculating all forces on all the nodes in the graph, and then solving Newton's equations of motion for each node. The standard procedure for solving these coupled differential equations on a computer is to break up the time into discrete intervals and then iteratively solve the equations of motion over those intervals.

In some embodiments, as mentioned above, position updates are performed by numerically solving Newton's second law. First, all forces are vector-summed and used to calculate a per-component acceleration. The acceleration is integrated over time to produce a per-component velocity and the velocity is integrated over time to produce a per-component position. All manners of algorithm for integrating Newton's equations of motion (called integrators) may be used. For instance, these include, without limitations, the Euler algorithm, the Verlet integrator (including Velocity Verlet algorithm), the Leapfrog integrator, the Runge-Kutta integrator, etc. The skilled artisan will understand that these algorithms have different trade-offs, wherein more accurate or stable algorithms may require more CPU resources. The right balance between accuracy and efficiency may change depending on the user requirements.

During each iteration of the minimization force-directed process, the force calculation and position update steps are iterated in a loop until the user decides that an acceptable clustering has been achieved. The iterative process may otherwise be stopped and restarted with different execution parameters should a satisfying result not be achieved. Alternatively, different iterative branches or paths may be sequentially or concurrently implemented using different parameters, for example, once certain clusters have been formed (and optionally pinned on the graph) while others remain in active migration and for which alternative parameters may yield more conclusive results.

Namely, in some embodiments, parameters that affect the force calculations may be updated at any time, even while the algorithm is looping. Parameter changes are then taken into account on the next full loop. In some embodiments, the program may run on either a regular CPU or a GPU, the latter possibly offering advantages in terms of processing speed given highly parallel GPU architectures.

For some configurations, the vector sum of the attractive forces will not be zero. The system may then acquire momentum and continue to drift off in one direction even after a suitable amount of clustering. There may also be persistent local oscillations, and groups of components that orbit one another. One way of mitigating these effects is to increase the amplitude of the friction force. Other methods of addressing these effects are to remove the center of mass drift at every iteration (or summing the forces at each iteration and, if the sum is non-zero, applying a small bias force to every component such that the sum becomes zero). Other methods that result in a fixed center of mass may also be employed.

Other optimization techniques may also be applied, for example, but without limitation, adaptive step sizes, using particle neighbor lists (i.e. Verlet lists), dividing the space into cells (i.e. using quadtrees (2D) or octree (3D), etc), or similar. The skilled artisan will appreciate that a large array of optimization techniques may be applied to the described embodiments without changing the general nature of the present disclosure.

In some embodiments, the method may automatically make small random changes to the force parameters to increase the probability of the node finding an equilibrium state. In other embodiments, a small random force can be added to each node to increase the likelihood of the system finding a lower local minimum. By increasing and decreasing the small random forces (i.e. equivalent to heating and quenching a physical system), a simulated annealing algorithm may be applied, for example.

As will be appreciated by the skilled artisan, other techniques may be applied to cluster or otherwise migrate data nodes to a more informative graph state. For example, the nodes within the graph may be moved so to minimize the "energy" function represented by the forces experienced by each node, as illustratively detailed above. For instance, different numerical minimization/optimization techniques may be used on the "energy" function, depending on its characteristics. Local minimization methods including, without limitation, methods such as steepest descent (SD), conjugate gradient (CG), Quasi-Newton (QN) (i.e. BFGS, L-BFGS) or similar may be used. Global minimization methods, such as those using stochastic optimization algorithms like simulated annealing or similar may also be used, to name a few examples.

In some embodiments, the interactive user interface 112 may resemble that of a movie playing application. For example, most of the screen can be devoted to showing the nodes representative of an IC component and their positions. It may also be updated in real-time (or again for every defined number of iterations) as the method progresses. In some embodiments, there may be a "play" and "pause" button. Pressing the pause button can temporarily halt screen updates and/or dynamic node migration iterations. Likewise, a button can be included to advance the minimization procedure by N iterations and automatically pause. In some embodiments, the user can control the camera's lens, thus allowing the display to be panned or zoomed in or out at any time, even while the program is running. In some embodiments, a "Skip Back" feature is also provided, allowing the user to return to a previous state. In doing so, the user may, in some embodiments, change parameters and resume the program from any previous point in "time" (i.e. a previous "iteration"). Doing so can create a new "branch" state. The application may keep track of the branches and allow a user to switch to any branch on command. In some embodiments, the user may also have the option to control the screen refresh rate. In doing so, the screen would only be refreshed every N iterations with the result of increasing the speed (in real time) at which the algorithm advances. These and other like visualization and dynamic control functions and features may be considered without departing from the general scope and nature of the present disclosure.

In some embodiments, a user may select and move with a mouse any number of nodes at any time, even while the program is running. This immediately changes the absolute position of the nodes. On the next iteration, the new positions are used to perform force calculations as usual. With this feature, a user may "pull apart" large homogenous clusters of nodes to see if smaller clusters form.

In some embodiments, any number of nodes may be "pinned" to or "un-pinned" from the canvas at any time, even while the program is running. Pinned nodes participate in force calculations as usual, however their positions are simply not updated. This gives the impression that pinned nodes are affixed to the canvas, while un-pinned nodes remain free to move around them. This feature is useful if the user knows the function of one or more nodes (perhaps through a previous analysis). These nodes may be placed in a location on the canvas far away from the rest of the components, and then pinned there. Those un-pinned nodes that are functionally related to those in the pinned group tend quickly to gravitate toward the pinned group, making them easy to spot.

In some embodiments, the canvas may be projected to the user using a virtual reality headset. Using the more encompassing viewing environment provided such technology can make it easier to locate subtle clusters in locations where a 2-D screen projection might obscure them.

EXAMPLE

The following describes, with reference to FIGS. 2 to 8, an illustrative embodiment of a IC RE data management system, as generally described above, in which an exemplary RE IC data set is being processed via an integrated GUI.

With reference to FIG. 2, and in accordance with one exemplary embodiment, an exemplary starting configuration of an input graph is shown. Each node's initial position is taken from a layout of a digital circuit schematic that was previously imaged. As noted above, an initial graph location may or may not be directly related to its actual physical location on a corresponding IC layout. For example, this information may not be readily available in some implementations (e.g. when working from a netlist of components and their connections), or may not be amenable for informative rendition (e.g. where a multilayer device would typically result in an undecipherable 2D mapping), or again where a random or otherwise specified initial graph option could be expected to lead to quicker convergence and/or to provide greater clustering visibility during graph node migration, to name a few examples. These and other such examples should be considered to fall within the general scope and nature of the present disclosure, as will be readily appreciated by the skilled artisan.

With reference to FIGS. 3A and 3B, and in accordance with one exemplary embodiment, flight-lines illustrating the connections between selected nodes and the remainder of the circuit are shown. As one can readily observe, while connected nodes generally represent functionally related IC components, they are not necessarily initially close to one another based on the input IC layout. This is clearly seen in FIG. 3A for a small number of selected components and in FIG. 3B for a larger number of selected components.

With reference to FIGS. 4A to 4C, and in accordance with one exemplary embodiment, the evolution of the positions of the starting nodes of FIG. 2 are shown after 10 iterations (FIG. 4A), 50 iterations (FIG. 4C) and 150 iterations (FIG. 4C).

Figure 5A:
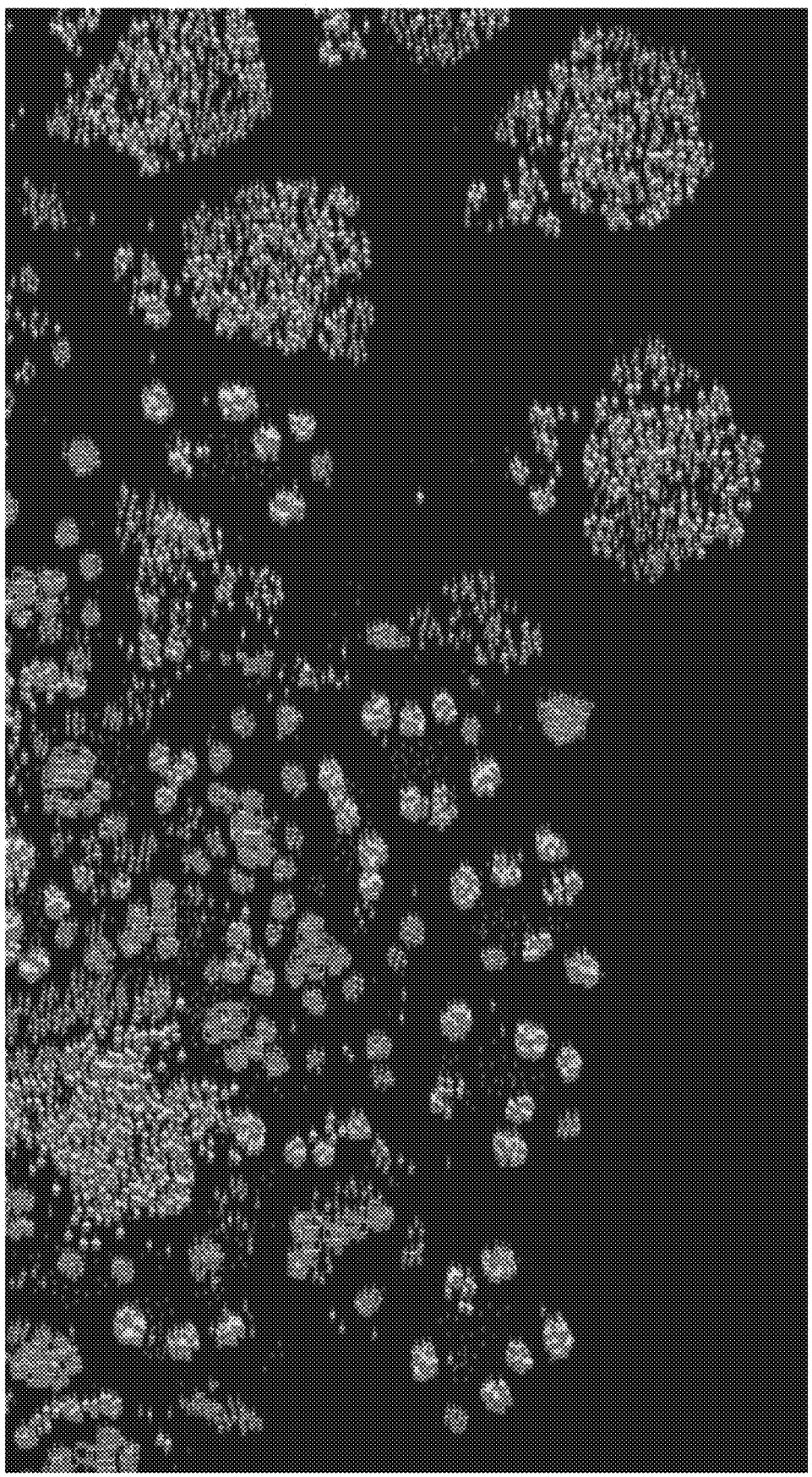
FIGS. 5A and 5B are exemplary close-up screenshots taken from a lower portion of the screenshot of FIG. 4C to provide a close-up view of various clusters having automatically migrated to that area by virtue of the clustering tool, with FIG. 5B further showing clustered inter-component connections exhibiting enhanced local connectivity.
Figure 5B:
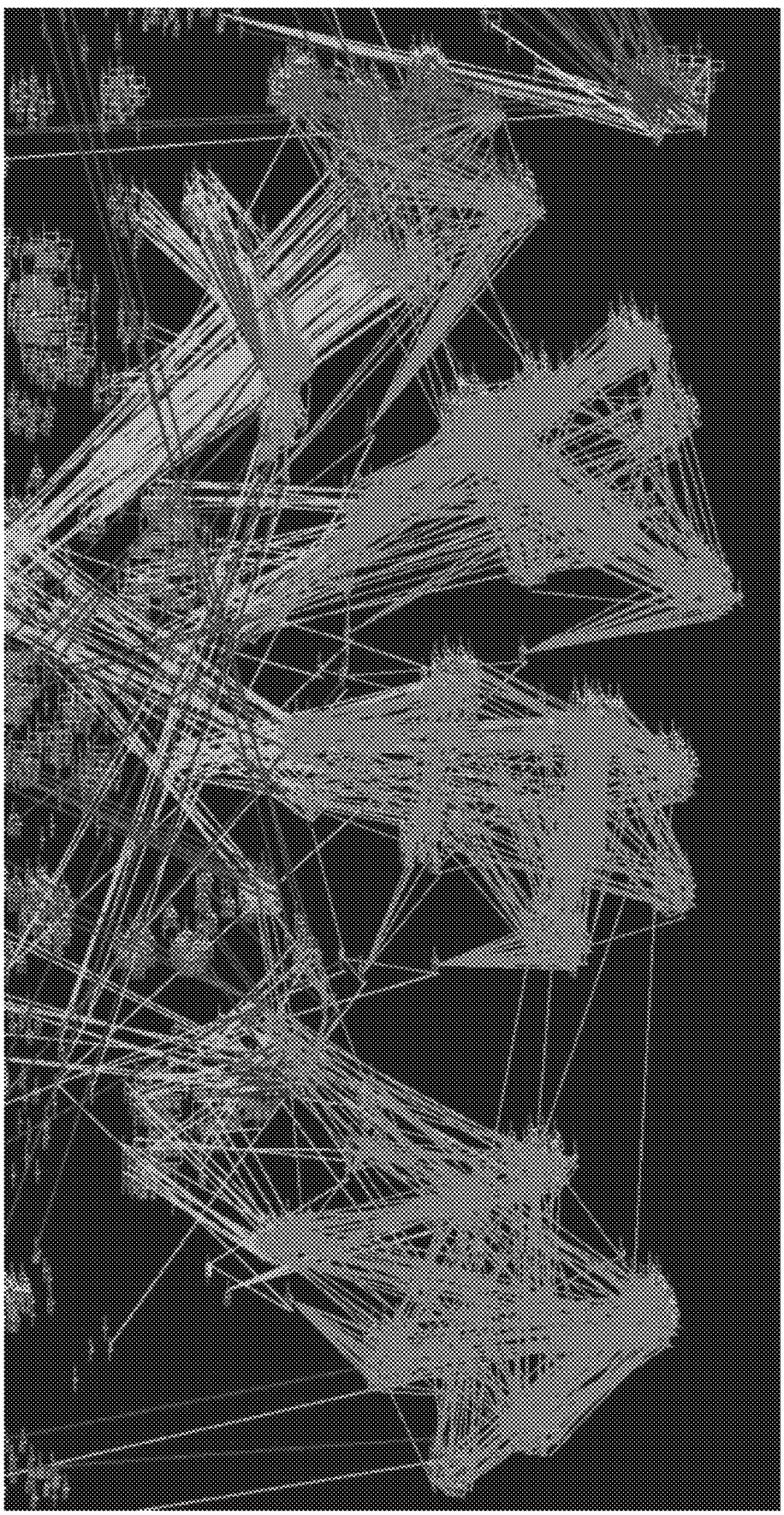

With reference to FIGS. 5A and 5B, and in accordance with one exemplary embodiment, the connectivity between nodes of a series of clusters is illustrated. FIG. 5A shows a close-up of the bottom of the configuration shown in FIG. 4C whereas FIG. 5B illustrates the connectivity between nodes. It is observed that the clusters have high local connectivity.

Figure 6:
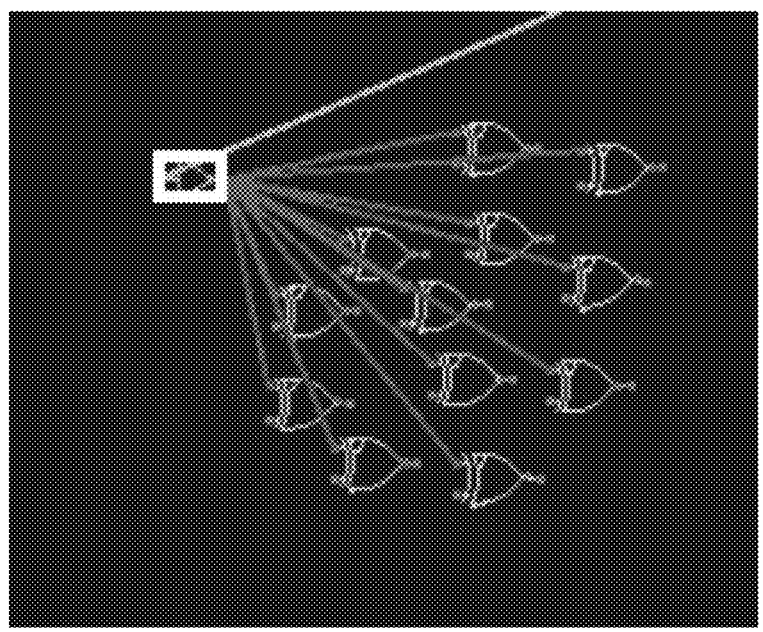
FIG. 6 is an exemplary screenshot of an IC buffer (shown within a selection box) and a related cluster of XOR gates to which it connects, once so clustered from the initial IC layout of FIG. 2 by the system of FIG. 1.

With reference to FIG. 6, and in accordance with one exemplary embodiment, a cluster consisting of nodes representing XOR gates is shown close to a node representing a buffer (boxed component) to which it connects.

Figure 7:
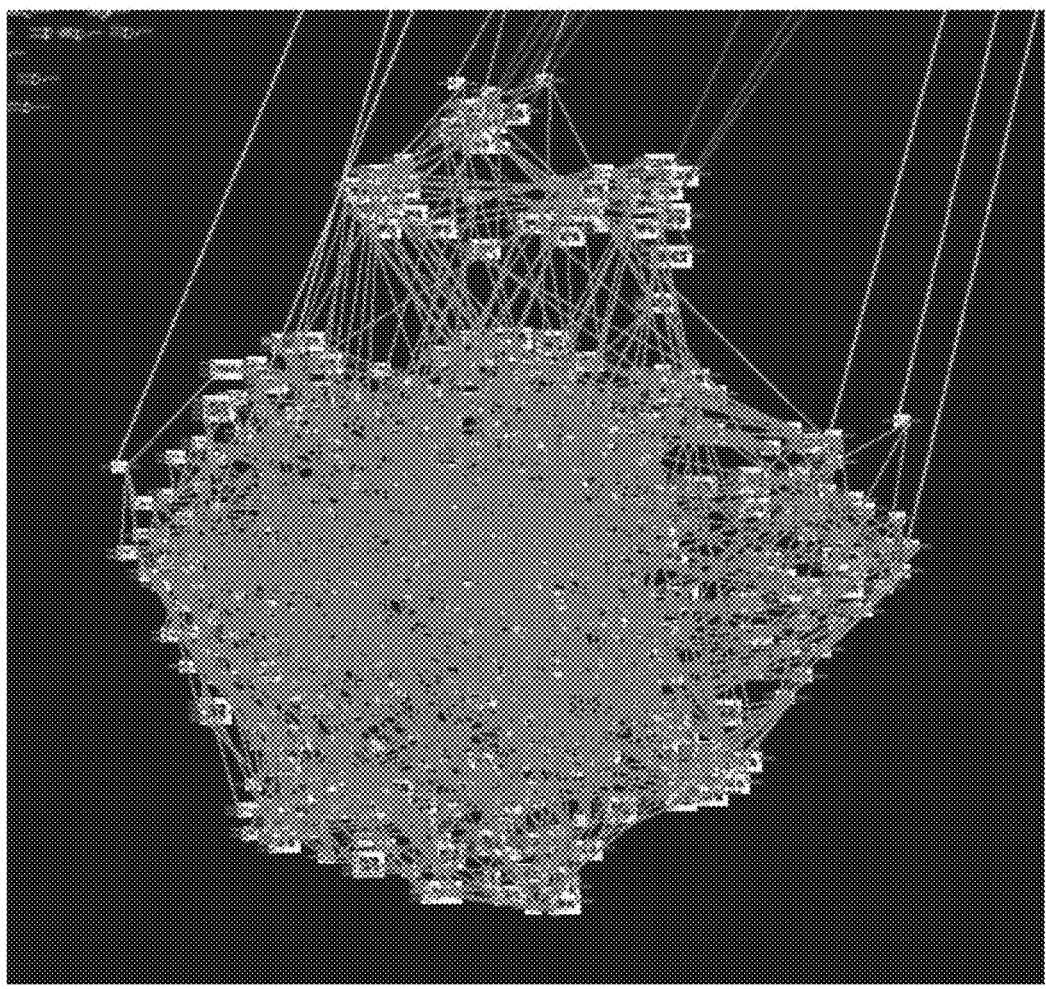
FIG. 7 is an exemplary screenshot of a clustered group of 397 instances of combinational logic having only 8 inputs and 8 outputs, once so clustered from the initial IC layout of FIG. 2 by the system of FIG. 1.

Similarly, FIG. 7 shows a large group of 397 connected nodes representing components of combinational logic. It is readily observed that the group collectively has only 8 inputs and 8 outputs, which can be effectively drawn using distinct colour coded flight lines.

Figure 8:
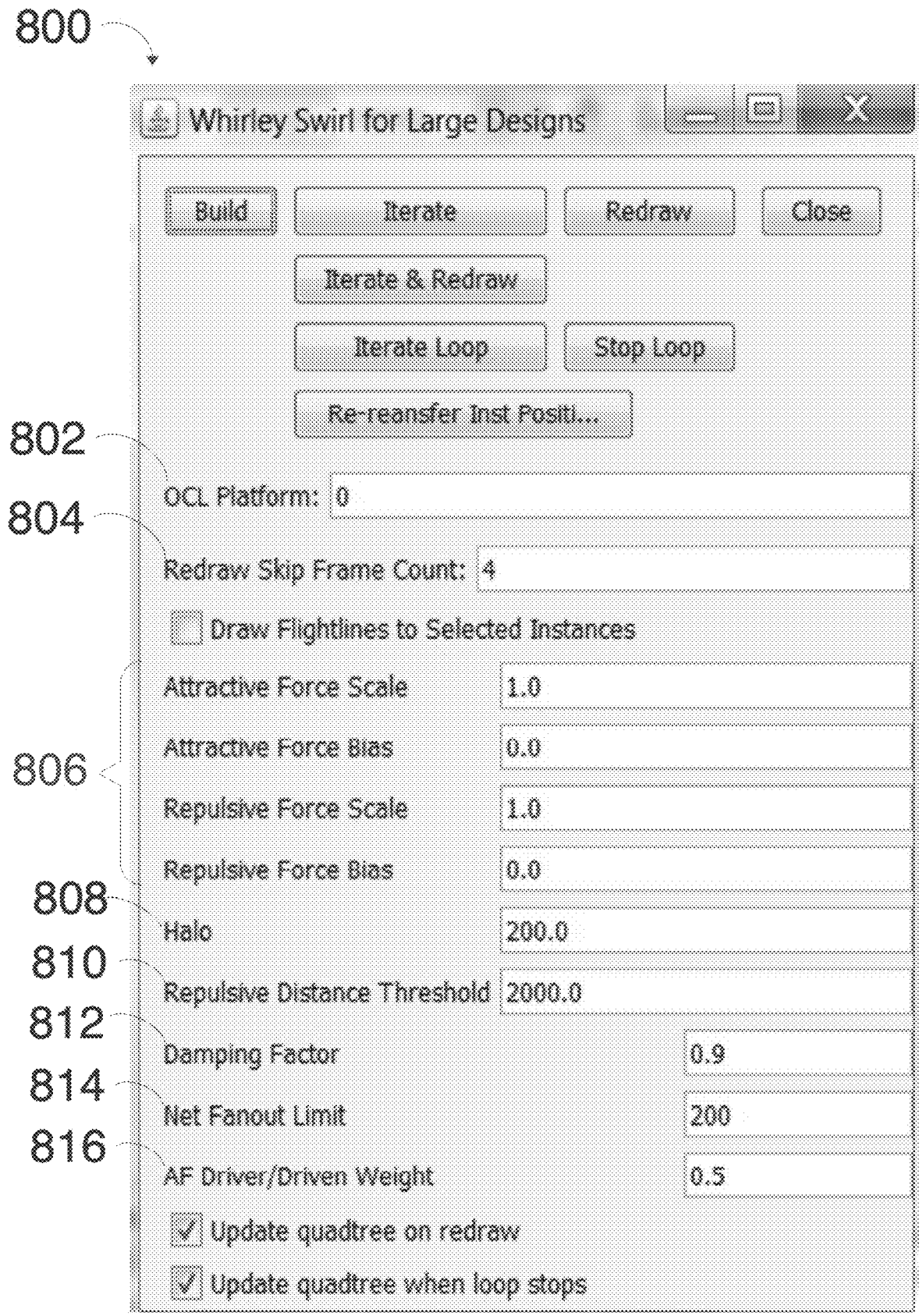
FIG. 8 is an exemplary screenshot of a User Interface operable to modify various functional parameters of the automated visual IC component clustering tool of the system of FIG. 1.

With reference to FIG. 8, and in accordance with one exemplary embodiment, a User Interface 800 used to change the operational parameters of the method is shown. The platform parameter 802 controls on which Graphical Processing Unit (GPU) the program is to be executed, in the case where the computer has more than one available GPU. The Redraw Skip Frame Count parameter 804 controls how many iterations are to be run before the screen is refreshed. Parameter set 806 (Attractive/Repulsive Force Scale and Attractive/Repulsive Force Bias) tune the parameters related to the biases and the strength of the attractive and repulsive forces. The Halo parameter 808 sets the distance from the center of a component to its halo ring, as described above. The Repulsive Distance Threshold parameter 810 sets the distance over which the repulsive force is set to zero between two components. The Damping Factor parameter 812 sets the friction force coefficient which controls the magnitude of the friction force. The Net Fanout Limit coefficient parameter 814 sets the minimum number of fanouts a net may have before being excluded when building the connection table (global vs local). Finally, the AF Driver/Driven Weight parameter 816 linearly controls how strongly the bias to the attraction forces is between driver-to-driven and driven-to-driven components. (Between 0 and 1. At a value of 0, driver-to-driven connections attract strongly; at 0.5 there is no difference between driver-to-driven and driven-to-driven connections, and at 1.0 driver-to-driven connections produce no attraction).

As will be appreciated by the skilled artisan, while the above provides some exemplary screenshots of a system and method in operation in accordance with the embodiments described herein, other features, parameters and visual attributes may be considered within the present context without departing from the general scope and nature of the present disclosure.

Namely, while the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. An integrated circuit (IC) reverse engineering data management system for processing IC component data extracted from a target IC, the system comprising:
a data storage device operable to store a data structure comprising a plurality of extracted IC component data nodes representative of a corresponding plurality of IC components of the target IC and a connectivity therebetween;
a graphical user interface (GUI); and
a digital data processor operable on said data structure to:
render, via said GUI, a dynamic graph of said data nodes; and
graphically migrate at least some of said data nodes on said dynamic graph as a function of a connectivity thereof with other nodes, wherein connected nodes are attractively displaced relative to one another such that said migrating nodes progressively cluster with related nodes to define distinct IC component clusters representative of distinct groups of related IC components of the target IC, whereas unconnected nodes are repulsively displaced so to progressively distance said unconnected nodes.

2. The system of claim 1, wherein said data structure further associates an initial physical location for each of said extracted IC component data nodes in accordance with an extracted physical IC layout of the target IC; wherein said dynamic graph is initially rendered based on each said initial physical location in accordance with said extracted physical IC layout; and wherein said at least some data nodes are initially graphically migrated from their respective initial physical location.

3. The system of claim 1, wherein said digital data processor is further operable to graphically migrate said at least some data nodes as a function of a distance therebetween.

4. The system of claim 3, wherein said distance function comprises at least one of a linear or a logarithmic attractive force function for connected nodes.

5. The system of claim 4, wherein said attractive force function is reversed within a halo distance from any of said connected nodes to reduce node overlap.

6. The system of claim 3, wherein said distance function further comprises a repulsive force component applied between each said at least some data nodes that are located within a threshold repulsion distance so to progressively distance any of said unconnected nodes that are within said threshold repulsion distance.

7. The system of claim 1, wherein said digital processor is operable to graphically migrate said at least some data notes based on a damped force-directed process.

8. The system of claim 1, wherein said data structure comprises a netlist.

9. The system of claim 1, wherein said digital processor is further operable to graphically render said connectivity for a selection of said nodes by visually rendering cluster connections for selected IC component clusters, wherein said distinct IC component clusters are representative of distinct IC functional groups.

10. The system of claim 1, further comprising an IC component extraction tool automatically extracting said extracted IC component data nodes from one or more digital images of the target IC.

11. The system of claim 1, wherein the digital data processor is further operable to render said dynamic graph as an interactive mapping of said nodes and enable digital input characterization of selected nodes via said mapping based on said clusters to update said data structure accordingly.

12. A non-transitory computer-readable medium for managing extracted integrated circuit (IC) reverse engineering (RE) data and having computer-executable instructions stored thereon to:
access a stored data structure comprising a plurality of extracted IC component data nodes representative of a corresponding plurality of IC components of a target IC and a connectivity therebetween;
render, via a graphical user interface (GUI), a dynamic graph of said data nodes;
iteratively calculate a displacement of at least some of said data nodes as a function of a connectivity thereof with other nodes, wherein connected nodes are attractively displaced relative to one another and whereas unconnected nodes are repulsively displaced relative to one another; and
graphically migrate said at least some data nodes on said dynamic graph based on said iterative calculation such that said migrating nodes progressively cluster with related nodes to define distinct IC component clusters representative of distinct groups of related IC components of the target IC.

13. The non-transitory computer-readable medium of claim 12, wherein said stored data structure further associates an initial physical location for each of said extracted IC component data nodes in accordance with an extracted physical IC layout of the target IC; wherein said dynamic graph is initially rendered based on each said initial physical location in accordance with said extracted physical IC layout; and wherein said at least some data nodes are initially graphically migrated from their respective initial physical location.

14. The computer-readable medium of claim 13, wherein said instructions to iteratively calculate said displacement are based on an iterative damped force-directed process applied between said at least some nodes.

15. The computer-readable medium of claim 13, further comprising instructions to graphically render said connectivity for a selection of said nodes by visually rendering cluster connections for selected IC component clusters.

16. The computer-readable medium of claim 13, further comprising instructions to render said dynamic graph as an interactive mapping of said nodes and enable digital input characterization of selected nodes via said mapping based on said clusters to update said data structure accordingly.

17. The computer-readable medium of claim 12, further comprising instructions to calculate said attractive displacement of said at least some data nodes as a function of a distance therebetween.

18. The computer-readable medium of claim 17, wherein said attractive displacement is reversed within a halo distance from any of said connected nodes to reduce node overlap.

19. The computer-readable medium of claim 17, wherein said distance function further comprises a repulsive force component applied between each said at least some data nodes that are located within a threshold repulsion distance so to progressively distance any of said unconnected nodes that are within said threshold repulsion distance.

20. A computer-implemented process for managing integrated circuit (IC) reverse engineering (RE) data comprising:
accessing a stored data structure comprising a plurality of extracted IC component data nodes representative of a corresponding plurality of IC components of a target IC and a connectivity therebetween;

rendering, via a graphical user interface (GUI), an interactive graph of said data nodes, wherein data stored in said stored data structure in association with each of said data nodes is graphically accessible from and editable via said interactive graph;

iteratively calculating a displacement of at least some of said data nodes as a function of a connectivity thereof with other nodes, wherein connected nodes are attractively displaced relative to one another and whereas unconnected nodes are repulsively displaced relative to one another;

graphically migrating said at least some data nodes on said interactive graph based on said iterative calculation such that said migrating nodes progressively cluster with related nodes to define distinct IC component data node clusters representative of distinct groups of related IC components of the target IC; and receiving selective data node edits for a given group of related IC components via digital selection of a given data node cluster on said interactive graph.

21. The computer-implemented process of claim 20, wherein said stored data structure further associates an initial physical location for each of said extracted IC component data nodes in accordance with an extracted physical IC layout of the target IC; wherein said interactive graph is initially rendered based on each said initial physical location in accordance with said extracted physical IC layout;

and wherein said at least some data nodes are initially graphically migrated from their respective initial physical location.

22. The computer-implemented process of claim 20, wherein said iteratively calculating comprises calculating said displacement of said at least some data nodes as a function of a distance therebetween.

* * * * *